Oct. 3, 1939.         T. B. CHACE         2,174,733
CLAD METAL AND METHOD OF MAKING THE SAME
Filed Oct. 21, 1936
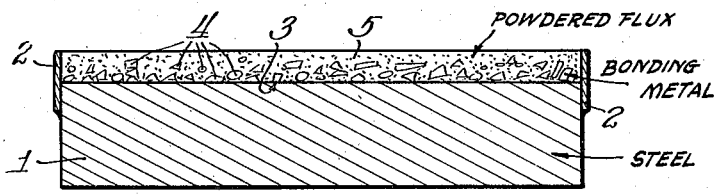
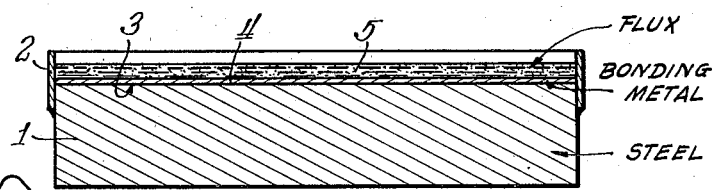
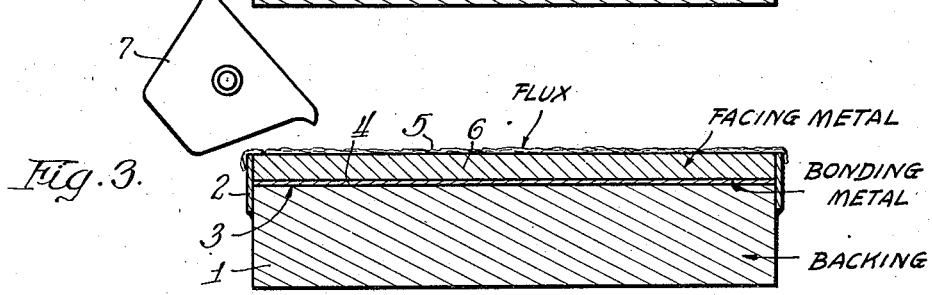
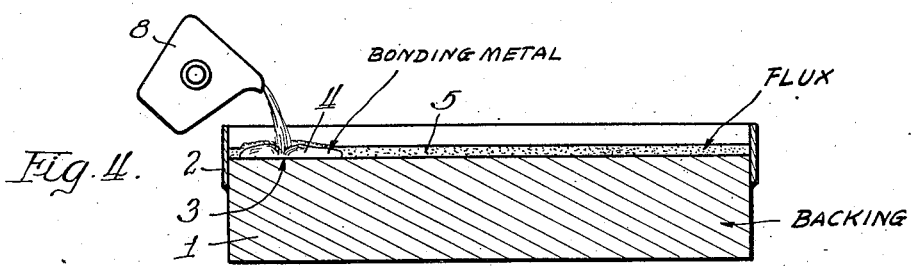
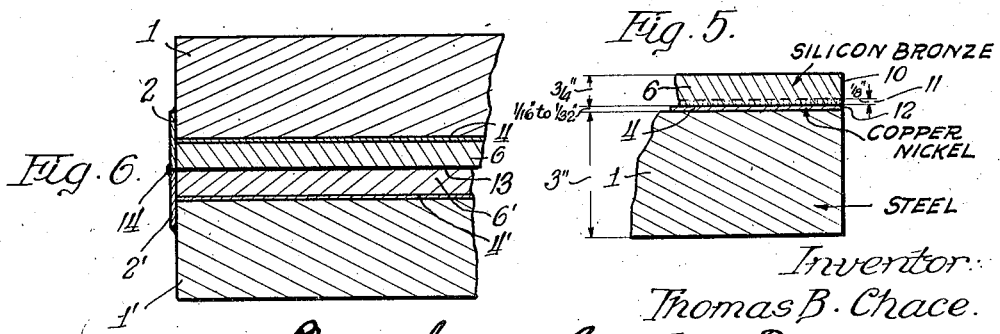
Inventor:
Thomas B. Chace.
By Brown Jackson Boettcher Dienner
Attys.

Patented Oct. 3, 1939

2,174,733

UNITED STATES PATENT OFFICE 2,174,733

CLAD METAL AND METHOD OF MAKING THE SAME

Thomas B. Chace, Winnetka, Ill., assignor, by direct and mesne assignments, to Clad Metals Industries, Inc., Chicago, Ill., a corporation of Illinois Application October 21, 1936, Serial No. 106,869

8 Claims. (Cl. 22—203)

My invention relates to the production of clad metal and more particularly is concerned with the cladding of steel with a corrosion resisting alloy of copper such as silicon bronze or the like. The principles of the invention are applicable to the cladding of one metal or alloy with another metal or alloy of lower melting point, as will be apparent from the present specification.

In the cladding of steel, such as low carbon steel, with a copper alloy such, for example, as copper with a small percentage (0.5 to 5.0) of silicon, with or without other ingredients, such as manganese, tin, or the like in small percentage, it has been found difficult to secure a direct bond which will be sufficiently ductile to withstand severe reduction in section such as is economical for rapid and inexpensive conversion to finish sheets, strip and the like.

In my prior application, Serial No. 6,497, filed February 14, 1935, I have disclosed the advantages of employing nickel as an ingredient of the bond for securing the desired qualities. The control of the nickel at the bond is difficult if the nickel is to be confined to that region because nickel readily alloys, not only with the steel but also with the copper. Also, since nickel by itself has a high melting point, it is difficult to handle in that manner.

In my prior application, Serial No. 64,280, filed February 17, 1936, I have disclosed the incorporation of the nickel in the copper silicon alloy whereby to gain a more definite control of the nickel and also to facilitate and expedite the formation of the bond.

In the endeavor to secure a close correspondence in physical properties between the copper alloy facing and the steel backing I have found it necessary to control the analysis of the copper alloy very closely, because the presence of small amounts of alloying ingredients may cause pronounced changes in physical properties as well as in corrosion resisting properties. I discovered, in keeping record of the analysis and corresponding properties, that the absorption of iron by the copper alloy was a factor which was not under definite control and hence undesired variations of physical properties and of corrosion resistance occurred.

Upon examining the various techniques employed I noted that when silicon bronze was bonded directly to steel without a bonding metal or alloy it is necessary to leave the molten bronze in contact with the welding surface of the steel for a period of from 5 to 35 minutes. During this soaking period the copper alloy tends, in some cases, to pick up a considerable amount of iron. For certain purposes the iron is objectionable. When nickel is embodied in the copper alloy, in addition to or as a substitute for silicon, and the copper alloy poured directly upon the face of the preheated slab, a similar variation in the iron pickup may occur, due to variations in heating, pouring, or time during which the alloy is allowed to remain molten in contact with the iron.

The use of a layer of nickel confined to the region of the bond adds somewhat to the cost of practicing the process by introducing special handling and heating, but I observed that it contains the possibility of segregating quite effectively the iron and the copper silicon facing, and I have, according to the present invention, developed a simplified method of employing an intermediate or bonding layer which limits or greatly reduces the escape of iron into the copper alloy. Thus I am able to maintain a close control of the analysis and hence physical and chemical properties of the facing metal.

Thus, according to the present invention, I apply to the welding face of the steel slab a layer of metal or alloy, preferably an alloy of nickel such as a copper-nickel alloy or Monel metal or the like, which bonds readily to the steel backing with a tough, tenacious bond, and interposes a layer of a melting point sufficiently above that of the copper alloy employed for facing purposes that no serious migration of iron from the steel to the copper facing can occur. The transfer or migration of nickel from the bonding alloy to the facing alloy is not serious, as the addition of a small amount of nickel to the facing alloy does not objectionably alter the physical properties or corrosion resistance.

I have observed that where iron migrates into the molten copper-silicon alloy it appears to float toward the surface of the said alloy. This is probably due to the specific gravities involved, although I am not able to state this from definite knowledge. The high iron content near the surface may be due to some other cause. Suffice it to say, however, that the presence of iron at or near the outer surface is generally undesirable.

By the present invention an effective barrier is interposed, and this barrier has the valuable quality of being itself not adversely affected by the absorption of iron, but provides a tough, ductile bond capable of resisting the severe treatment of heavy rolling.

My invention further permits the use of inexpensive scrap metal for the rather expensive bonding metal and thus tends further to reduce the cost of the same.

The particular character of bonding metal and facing metal is, of course, to be selected in conjunction with the size of the slab to which the same is to be applied, and likewise selection of these alloys should be made according to the carbon content of the steel slab.

Another feature of the present invention resides in the utilization of the bonding metal as a source of nickel or similarly functioning ingredient for the facing metal.

Where the thickness of facing metal is to be reduced to a minimum as for example 5% to 10% instead of 10% to 20% of the thickness of the finished sheet, bar, rod or the like it is particularly important to minimize the migration of iron into the facing metal; at the same time it is desirable that the bonding layer be held at minimum thickness in order to give maximum thickness of the facing metal within the limits selected. Thus by employing a bonding metal high in nickel a bond which limits migration of iron may be secured and this in turn may, when the facing metal is poured upon the same, serve as a source of nickel for reenforcing the physical or other properties of the facing metal.

It is desirable to have nickel in combination with silicon for other purposes than bonding or for purposes in addition to bonding. Silicon copper comprising 1½% silicon or less is not sufficiently refractory to roll evenly with .12% carbon steel whereas 1½% of silicon and 1½% of nickel alloyed with copper form silicides in the copper which make the alloy more refractory. It is to be understood that small percentages of other ingredients such as manganese tin or the like may be added to improve the workability of the copper base alloy when that is desired without departing from the teachings of my invention.

Now in order to acquaint those skilled in the art with the manner of practicing my invention I shall describe, in conjunction with the accompanying drawing, a specific embodiment of my invention.

In the drawing:

Figure 1 is a vertical section through the open-faced mould when the same is charged with bonding metal and flux preparatory to heating of the slab;

Figure 2 is a similar section showing the bonding metal melted and bonded to the steel backing, with the flux floated to the top of the bonding metal, as occurs during preheating of the slab;

Figure 3 is a similar sectional view of the open-faced mould, with the facing metal poured on top of the bonding metal and the flux being floated off the surface of the facing metal;

Figure 4 is a similar sectional view of an open-faced mould with the bonding metal poured from a ladle or the like onto the surface of the slab, displacing the flux which covers the welding face of the slab;

Figure 5 is a fragmentary vertical section through a clad slab illustrating the relation of the facing metal, the bonding metal, and the steel backing; and Figure 6 is a vertical fragmentary section through a double clad slab with the facing metal of the two slabs towards each other for the purpose of rolling a double slab.

I have found that silicon-copper alloys are difficult to bond directly to steel, and require comparatively long soaking time to create a bond which can be subjected to rolling and other working operations. The long soaking period permits excessive iron pickup from the steel base and changes the analysis of the silicon-copper alloy. By first bonding a thin layer of pure copper, or a copper alloy low in silicon, the soaking period can be reduced. A good weld is made at the first union and a second layer, of a higher silicon copper, will bond quickly at the second union, requiring only normal cooling to the freezing point, which minimizes iron migration to the outer surface. The melting temperatures of the first and second layers of copper alloys are approximately the same, and in producing very large slabs the temperature is maintained long enough by the large mass to remelt the first layer, even though allowed to cool well below the melting temperature before the second layer is poured.

The specific gravity of iron is 7.9, compared to copper 8.85, so iron distribution through the copper alloy is relatively rapid. By utilizing an alloy free of iron and having all the other properties required, including a melting temperature between the steel base and the main copper alloy facing, very good control of iron migration is accomplished. A 50% nickel and 50% copper alloy melts at about 2400° F. This alloy bonds quickly to steel by melting on the steel base during preheating and requires only the normal cooling in air from the molten state for the soaking period. This might absorb from 1% to 2% of iron during soaking, but as only a thin layer is required, about $\frac{1}{32}$ inch in depth, the subsequent thick layer of the high copper alloy or silicon copper which makes up the main facing is kept substantially free from iron. Silicon copper, or a high copper alloy having a melting temperature below the bonding material will weld quickly to the bonding material, requiring only normal cooling in air after being applied in the molten state. Since the main facing alloy is separated from the steel base so that there is no contact of the two outer metals, the iron pickup therein is from the small amount in the bonding material which, when distributed through the thickness of several inches, is a negligible amount and is relatively unimportant.

The bonding alloy can be first welded to the steel base by heat and pressure method, but I prefer welding by fusion, which assures a better and more certain weld. The bonding alloy may be Monel metal, which has a higher melting temperature than the cuprous metal, that is, around 2460° F., or a lower melting temperature copper-nickel alloy of 70% copper and 30% nickel, having a melting temperature of around 2240° F. This choice would depend somewhat on the size of the slab, on the details of equipment available for carrying out the process, and other factors.

Nickel-copper alloys are very sensitive to atmosphere and must be kept completely sealed from furnace gases.

The bonding alloy can be first welded to the steel base from any number of forms. After the steel base which makes up the bottom of the open-faced mould has been cleaned and fluxed with a covering of boric acid powder or the like, the correct weight of bonding alloy can be added as a thin sheet, powder, stock, or scrap metal, and completely covered with additional boric acid powder so as to seal the bonding metal as well as the welding surface of the steel from atmosphere, as illustrated in Figure 1. As shown in Figure 1 the steel slab 1 has a steel strip 2 welded about the margin of the same to produce an open-faced mould or liquid-retaining basin the bottom of which is formed by the welding face 3 of the steel slab to which the cladding metal is to be bonded. This face 3 is cleaned, as by sand blasting, and within the basin formed by the peripheral welded strip 2 and the welding face 3 is disposed the bonding metal, in the form of powder, stock or scrap metal, covered with borax, glass, or other suitable flux which melts at a temperature lower than the oxidizing temperature of the nickel-containing bonding material 4. As the bonding metal fills only a small depth of the mould it can easily be kept covered with flux both prior to and during the melting of the said bonding metal 4. The assembly shown in Figure 1 is subjected to furnace temperature high enough to melt the bonding metal 4 (slightly above 2400° F. for a 50% copper and 50% nickel alloy). The bonding metal is applied in solid form, as shown in Figure 1, melts, and runs out evenly over the steel surface under the flux, assuring contact and uniformly perfect bonding throughout the entire surface 3. The flux 5 floats to the top, completely sealing the bonding metal. The bonding metal, when cooled to room temperature and having the flux broken away from the same, shows a clear, bright, shining surface for welding of the high copper alloy thereto.

After the melting of the bonding metal and the bonding of the same to the surface 3, the assembly shown in Figure 2 is then removed to a level table outside of the furnace and allowed to cool to a temperature under the freezing temperature of the bonding metal 4, or approximately 2100° F. Thereupon, the remainder of the mould is filled with molten silicon-copper 6, as from the ladle or crucible 7, or it may be filled with a lower melting point high copper alloy. This facing metal 6 bonds very readily and quickly to the copper-nickel surface of the layer 4 and is kept in molten condition only long enough for the flux and other non-metallic particles to work to the surface, as indicated at 5. When silicon-copper is employed for the facing layer 6 the flux and slag can be skimmed off immediately after pouring and while still molten, as silicon copper can be exposed to air when molten and it freezes with only a thin oxide on the surface, which is quite satisfactory for rolling without cleaning or machining operations. The flux and slag 5 may be skimmed off by running a flat, long-handled, spade-shaped instrument across the top, this instrument resting on the upper edge of the two side strips. The mould is poured full to the top of the strips 2 with the facing metal, particularly where copper-silicon alloy is employed, so that the fused flux stands above the rim of the mold strip 2 and skims off very easily. Then, as soon as the facing metal on the slab solidifies, the composite slab may be rolled at a hot rolling temperature.

The steel slab 1, with the open mould formed thereupon by the peripheral strip 2, may, as shown in Figure 4, be fluxed and preheated and the bonding metal melted independently as in the crucible or ladle 8, and poured onto the surface 3 of the steel slab to the proper thickness. The molten bonding metal will flow under the flux, as shown in Figure 4, and distribute itself over the surface 3, and when the assembly is cooled to below the freezing temperature of the bonding metal the high copper facing alloy can be poured to fill the mould.

There is some nickel pickup from the bonding metal 4, but this, of course, does not affect the corrosion-resisting properties of the high copper alloy and in some cases, such as a 1½% silicon-copper alloy, an addition of nickel is desired for improving the rolling properties. Nickel does not migrate into copper as readily as iron, as the specific gravity of nickel is 8.8 compared to iron 7.9 and copper 8.85.

I have made analyses of samples taken from various regions of the facing alloy and of the bonding alloy. In the case of a composite slab of the dimensions shown in Figure 5, using a copper-nickel bonding metal of 50% copper and 50% nickel, and using a facing metal of silicon bronze employing substantially 1½% silicon, I find that the outer surface portion 10 of the facing metal 6 exhibits an analysis of—

|  | Percent |
|---|---|
| Copper | 95.89 |
| Silicon | 1.22 |
| Nickel | 1.24 |
| Iron | 1.28 |

For the region represented by the metal within ⅛ inch above the bonding alloy 4, the analysis showed the following:

|  | Percent |
|---|---|
| Copper | 94.92 |
| Silicon | .97 |
| Nickel | 2.69 |
| Iron | .95 |

The analysis of the bonding metal 4, as indicated at 12, showed the following:

|  | Percent |
|---|---|
| Copper | 44.99 |
| Nickel | 45.95 |
| Iron | 7.15 |

The slab in Fig. 5 represents a ten minute soaking of the copper-nickel bonding alloy in the molten state on the steel and a thirty minute soaking of the silicon copper facing metal in molten state on the copper nickel bonding alloy.

A similar slab processed with a thirty minute soaking of the silicon facing metal in molten state on the steel showed 5.67% iron at the outer surface portion 10.

A similar slab processed without soaking the copper-nickel bonding alloy but with a thirty minute soaking of the silicon copper facing metal showed in analyzing of the outer portion 10, only .36 iron and 1.29 nickel.

A similar slab processed without soaking either copper-nickel bonding alloy or the silicon copper facing alloy, which was done by pouring the bonding alloy and allowing it to solidify and then pouring the facing alloy and allowing it to solidify, showed only a .09 iron at portion 10.

A similar slab processed without the use of the bonding alloy and without soaking the silicon copper facing metal but by merely pouring the facing metal on the steel and allowing it to solidify showed in the analysis .96 iron at portion 10.

This last example did not produce a bond between the facing metal and the steel and the slab consequently separated in rolling. To create a bond suitable for rolling between silicon copper and steel, it is necessary to soak the silicon copper in molten state for a period which varies with the silicon content. The use of the nickel bonding alloy eliminates the necessity of the soaking period as the combinations bond readily to each other if merely poured in the molten state and allowed to solidify immediately. However, in combinations where the silicon content of the copper alloy is low, as for instance 1½% or less, it is desirable to improve the rolling properties of the silicon copper alloy by the addition of nickel which can be done by prolonging the soaking of the low silicon copper facing metal until sufficient nickel has migrated into the copper and the iron pick-up still maintained at the minimum.

Thus, by control of the soaking time, i. e., the time during which the facing metal is held in molten condition upon the face of the solid but heated bonding metal the pick-up of nickel from the bonding metal may be regulated to give the desired composition of the facing metal. This teaching is of value in regulating the composition of the facing metal particularly in the case of large slabs for the reason that with a large mass the cooling down of the mass to freeze or solidify the facing metal occupies some considerable time. By taking into account the nickel pick-up which will thus occur it is possible to get the right composition by starting with a facing alloy lacking the amount of nickel which the period of cooling will pick up. A certain amount of silicon may migrate with the bonding layer. This is not objectionable. In fact, I may add a small amount (i. e., up to 1½%) of silicon to said bonding alloy.

Composite slabs produced as above described may be rolled in four-ply assemblies, as shown in Figure 6, the cuprous facings 6 and 6' being put face-to-face, with a separating compound 13 between them, and the mould strips 2 and 2' welded together by a fusion weld 14, as indicated in Figure 6. Thereby the copper alloy is protected from atmospheric influence during rolling, the arc weld at 14 holding the two composite slabs together. The faces of the silicon-bronze layers need only be cleaned off as by sand blasting prior to assembly as shown in Figure 6. If the slag and flux are otherwise removed, sand blasting is not necessary. Since the arc weld 14 may be made about the entire periphery of the double thickness slab, the exclusion of atmosphere is entirely satisfactory.

I do not intend to be limited to the details shown and described.

I claim:

1. A clad metal comprising a backing of metal rich in iron, a facing of copper silicon alloy and a bonding layer of nickel alloy between the backing and facing of such thickness as to substantially prevent migration of iron into the facing when the latter is bonded to the bonding layer.

2. The method of facing a steel backing with a corrosion resisting metal substantially free of iron, which comprises bonding to the face of the steel backing a thin intermediate layer of a nickel-copper alloy of such thickness as to substantially prevent migration of iron into the corrosion resisting metal from the steel backing when the corrosion resisting metal is bonded to the intermediate layer and then bonding to the face of the layer of nickel-copper alloy a facing of copper-silicon alloy.

3. The method of claim 2 wherein the intermediate layer is bonded to the steel backing while molten and then allowed to solidify and the facing layer is bonded in molten condition to the solidified face of the intermediate layer.

4. The method of making copper clad steel, which comprises first bonding to a face of the steel a thin layer of a nickel-copper alloy of a melting point substantially higher than that of the facing metal and of such thickness as to substantially prevent migration of iron to a layer of facing metal when it is bonded to the layer of nickel-copper alloy, then bonding while molten the layer of a facing metal which is chiefly copper to the intermediate layer while the intermediate layer is in solid form.

5. Clad steel comprising a steel base faced with an alloy of copper containing substantially 1½% silicon and substantially 1½% nickel with iron from 0.1% to 0.5%, there being an intermediate layer of bonding alloy rich in nickel, fusion welded to the steel base and of such thickness as to substantially prevent migration of iron into the alloy facing when the latter is welded to the intermediate layer, and having the facing alloy fusion welded to the bonding layer.

6. The method of cladding steel with a cuprous facing having strength and rolling qualities comparable to steel which comprises cleaning the face of the steel, covering the same with flux, depositing in molten form upon the face of the steel a layer of copper-nickel alloy containing from 30% to 70% of nickel and of such thickness as to substantially prevent migration of iron from the steel to the cuprous facing when the latter is bonded to the layer of copper-nickel alloy, allowing said layer to solidify, depositing upon said layer a facing layer of copper containing approximately 1½% silicon and holding said facing layer in molten condition long enough to pick up from the first layer nickel to the amount of approximately 1½% and then allowing the facing layer to solidify.

7. A clad metal comprising a low carbon steel backing, a facing of copper alloy containing less than 5% silicon, and a bonding layer of nickel-copper alloy containing nickel ranging from 20% to 80% between the backing and facing of such thickness as to substantially prevent migration of iron into the facing when the latter is bonded to the bonding layer.

8. A clad metal comprising a backing of metal high in iron, a facing layer of copper-silicon alloy substantially free of iron, and a thin intermediate bonding layer comprising chiefly nickel bonded to the backing, the facing layer having a lower melting point than the intermediate layer and being fusion bonded to the intermediate layer.

THOMAS B. CHACE.